United States Patent [19]
Odorzynski et al.

[11] 4,347,332
[45] Aug. 31, 1982

[54] POLYAMIDE/POLYETHYLENE COPOLYMER FILM AND METHOD FOR PRODUCING

[75] Inventors: Thomas W. Odorzynski, Green Bay; Jack E. Knott, II, Appleton, both of Wis.

[73] Assignee: American Can Company, Greenwich, Conn.

[21] Appl. No.: 249,974

[22] Filed: Apr. 1, 1981

[30] Foreign Application Priority Data

Jun. 19, 1980 [GB] United Kingdom ................. 8020135

[51] Int. Cl.³ ............................................... C08K 5/36
[52] U.S. Cl. ................................ 524/169; 264/176 R;
264/210.6; 428/474.4; 524/230; 524/252;
524/522; 524/523; 524/524; 525/58
[58] Field of Search ................. 264/171, 176 R, 210.6;
260/32.6 N, 32.6 NA, 30.8 R; 428/474.4, 476.3;
525/58

[56] References Cited

U.S. PATENT DOCUMENTS

| 3,882,259 | 5/1975 | Nohara et al. | 428/35 |
| 4,064,296 | 12/1977 | Bornstein et al. | 428/35 |
| 4,239,826 | 12/1980 | Knott et al. | 428/35 |
| 4,240,993 | 12/1980 | Sun | 264/22 |
| 4,243,074 | 1/1981 | Strutzel et al. | 138/118.1 |
| 4,243,724 | 1/1981 | Strutzel et al. | 428/474.7 |
| 4,261,482 | 4/1981 | Yamada et al. | 222/215 |

Primary Examiner—Donald E. Czaja
Assistant Examiner—W. Thompson
Attorney, Agent, or Firm—Stuart S. Bowie; Thomas D. Wilhelm

[57] ABSTRACT

A blend of nylon and ethylene vinyl alcohol copolymer is provided which is suitable for conversion into films having desirable levels of strength and toughness, and good oxygen barrier properties. In addition, the blend exhibits enhanced adhesive qualities, as compared to films of EVOH copolymer per se, thus better adapting it for use in multilayer films. Methods for fabricating the resin blend into bare and composite films are also provided.

9 Claims, No Drawings

POLYAMIDE/POLYETHYLENE COPOLYMER FILM AND METHOD FOR PRODUCING

BACKGROUND OF THE INVENTION

Ethylene vinyl alcohol (EVOH) copolymers are recognized to have considerable value in packaging films, and especially those intended for use with foods and other products that require protection against oxygen. This is, of course, because of the excellent oxygen barrier properties of EVOH copolymer films, which are exhibited even in sections as thin as about 0.1 mil or less. Despite this, the EVOH resins suffer from a number of drawbacks.

In particular, films made from EVOH tend to lack toughness and to be relatively brittle, particularly in the thin sections in which they are most economically used. Moreover, of the films with which they are desirably and most practically combined, the EVOH copolymers exhibit good adhesion only to those made of nylon, thus necessitating the utilization of supplemental adhesives when other resins are to be joined thereto. The EVOH copolymers are also quite expensive.

On the other hand, it is also well recognized that films of high molecular weight, relatively high melting point polyamides exhibit outstanding levels of toughness and tensile strength, while at the same time offering good adhesion to a variety of resinous substrates or coatings; however, nylon is not an effective oxygen barrier polymer, for certain applications. Consequently, separate layers of EVOH copolymers and polyamides are presently employed in composite film structures, so as to obtain a desirable combination of the properties that are afforded by each.

Although it is entirely feasible to produce composite films of the foregoing nature by coextrusion or by extrusion coating, it is found to be rather difficult to achieve the measure of control necessary to produce uniform layers of the components, optimal adhesion, and a desirable balance of properties. Moreover, property variations are not readily made, as is desirable in many instances to tailor the film to use for specific applications.

It is believed that attempts have been made in the past to produce blends of polyamide resins (as well as other polymers) with ethylene vinyl alcohol copolymers, in an endeavor to provide extended compositions from which single-layer films exhibiting desirable properties might be produced. However, as far as is known such attempts have been unsuccessful, due primarily to compatibility problems and the difficulty of extruding the blended resins, while preserving the desirable properties of the components. In particular regard to the film-forming polyamide resins, those which exhibit the desired properties are processable only at temperatures that are considerably above the processing temperatures of the EVOH resins. Consequently, it has not heretofore been possible to extrude a blend of the two ingredients without intolerable degradation (essentially gel formation) of the copolymer. Moreover, it would be anticipated that, in any such blend, the excellent oxygen barrier characteristics of the EVOH copolymer would be significantly compromised, due to the presence of the polyamide resin, and that, conversely, the inherent physical or structural properties of the polyamide would be diminished in direct proportion to the amount of EVOH copolymer included.

Accordingly, it is a primary object of the present invention to provide a novel blend of a film-forming polyamide resin and an EVOH copolymer, which blend is processable at temperatures below those at which any substantial degradation of the EVOH copolymer will be encountered, to produce a film having a desirable balance of oxygen barrier and structural properties.

It is also an object of the invention to provide such a blend which is adapted to be coextruded with a second resin, to produce a composite film in which adhesion between the layers is at a desirable level.

Another object of the invention is to provide a novel process by which films having relatively high levels of strength and toughness, and excellent oxygen barrier characteristics, can be produced with relative facility and good economy, which process may entail the coextrusion with a second, distinct resin.

A further object of the invention is to provide novel products produced by the methods of the invention.

SUMMARY OF THE INVENTION

It has now been found that certain of the foregoing and related objects of the invention are readily attained in a synthetic resin blend comprising a polyamide resin, an EVOH copolymer, and a plasticizer for the polyamide resin. In accordance therewith, about 90 to 20 weight percent of a film-forming polyamide resin, having a molecular weight of about 20,000 to 30,000, and a melting point temperature of about 415 degrees to 440 degrees Fahrenheit, is intimately admixed with about 10 to 80 weight percent of an EVOH copolymer, having a molecular weight of about 15,000 to 30,000 and a melting point temperature of about 325 degrees to 375 degrees Fahrenheit. The plasticizer is incorporated with the polyamide resin and the EVOH copolymer in an amount of about 2 to 25 percent, based upon the weight of the polyamide resin, and it will be effective to lower the processing temperature of the latter to a value approximating that of the copolymer, and below the temperature at which any substantial degradation would occur therein.

In preferred embodiments, the amount of the film-forming polyamide will be about 75 to 25 percent, and conversely, the amount of the EVOH copolymer will be about 25 to 75 percent, with the plasticizer being included in an amount of about 5 to 15 percent, again based upon the weight of polyamide present. The plasticizer will normally be of such a composition, and used in such a concentration, as to permit processing of the blend at a temperature of about 400 degrees to 480 degrees (and preferably about 430 degrees to 450 degrees) Fahrenheit, and generally the plasticizer will be compounded with the film-forming polyamide resin prior to admixture with the ethylene vinyl alcohol copolymer. The plasticizer may be of either monomeric or polymeric nature, and suitable classes of compounds include long chain fatty acid amides, aromatic sulfonamides, and polyamides and copolyamides, having a molecular weight of 5,000 to 25,000 and a melting point temperature below about 400 degrees Fahrenheit; specific preferred plasticizers are lauramide, o,p-toluenesulfonamide, N-ethyl-o,p-toluene-sulfonamide, and polyamides of 7,000 to 10,000 molecular weight.

Other objects of the invention are provided by a novel method of making a film, wherein a blend of the foregoing composition is initially produced, preferably by pre-compounding the plasticizer and the film-forming polyamide resin. The blend is heated to the processing temperature, and is then forced through the die of an extruder to convert it to a molten film, after which the film is cooled to solidify it and to permit recovery of the ultimate product. Generally, the processing temperature will be in excess of 400 degrees Fahrenheit, and preferably it will be in the range of 430 degrees to 480 degrees Fahrenheit.

In the practice of the method, a second resin, different in composition from the blend, may be combined therewith in the die, to produce a laminar structure comprised of layers of the two components. The laminar structure will then be forced through the die to convert it to a film comprised of layers of the copolymer and of the second resin.

DETAILED DESCRIPTION OF THE PREFERRED EMBODIMENTS

EVOH copolymers that are suitable for use herein will generally contain at least about 55, and as much as 80, weight percent of vinyl alcohol in the molecule; the preferred copolymers will contain about 60 to 75 weight percent of the vinyl alcohol moiety. The remainder of the molecule will consist essentially of ethylene; however, because such products are produced by hydrolysis of ethylene vinyl acetate copolymers, some residual vinyl acetate will usually be present in the resin. Normally, there will be less than about 3 weight percent of vinyl acetate, and preferably it will be present at a level below 1.5 percent. The EVOH copolymers will typically have molecular weights in the range of about 20,000 to 30,000, corresponding roughly to melt indices of about 9 to 1.5; the melt index values for these resins are determined in accordance with ASTM Test D-1238, Procedure E or L, using a weight of 2160 grams and a temperature of either 190 degrees or 230 degrees Centigrade, as appropriate. Typically, the copolymers will have densities of about 1.1 to 1.2, and their melting points will normally range from about 325 degrees to 375 degrees Fahrenheit; suitable temperatures for processing them will be about 400 degrees to 480 degrees (and preferably about 430 degrees to 450 degrees) Fahrenheit. While the degradation temperature of EVOH is generally regarded to be about 450 degrees, it should be appreciated that this is not inconsistent, due to the residence time factor and its effect upon degradation. Specific EVOH resins that are suitable for use are available from Kuraray and from Nippon Gohsei, both of Japan, the products of the former company being designated EP-E and EP-F, and those of the latter company being designated GL-D and GL-E.

Insofar as the nylon utilized for blending with the EVOH copolymer is concerned, virtually any high molecular weight, relatively high melting film-forming polyamide resin may be utilized. Thus, while the polycondensation resins such as nylon 66 may be employed to advantage, for most purposes the addition polymer nylon 6 will be preferred as a practical matter. To be suitable for use, the nylon will generally have a molecular weight in the range of 20,000 to 30,000, and a melting point temperature of about 415 degrees to 440 degrees Fahrenheit, with a melting point temperature of about 430 degrees being optimal in many cases. Such polyamide resins are normally processed at temperatures of about 510 degrees to 540 degrees, thus giving rise to the fundamental difficulty which has heretofore precluded the successful formulation of extrudable blends of nylon with EVOH copolymers.

The compositions of the present invention are, on the other hand, processable at temperatures that are sufficiently low that degradation of the EVOH resin is avoided, and this result is achieved by the incorporation into the composition of an agent that serves as an effective plasticizer for the film-forming nylon. While some of the agents utilized may not previously have been regarded as plasticizers, in the present blends they do appear to perform that function. In other words, the plasticizing agents are capable of intermolecular hydrogen bonding within the polyamide resin, to effectively lower the temperature at which it can be processed. As a result, film-forming nylons that normally process at a temperature of about 510 degrees to 540 degrees Fahrenheit become processable at temperatures that are considerably lower and that are, in fact, within a range of temperatures at which the EVOH copolymer is also processable and not subject to significant degradation. More particularly, the plasticized film-forming polyamide resins are processable with the EVOH resins at temperatures of about 400 degrees to 480 degrees Fahrenheit, with preferred temperatures being about 430 degrees to 450 degrees.

The amount of plasticizer utilized may vary between fairly wide limits, and as little as 2 percent or as much as 25 percent, based upon the weight of the polyamide resin, may be employed. For satisfactory results, however, it will often be necessary to use a concentration of plasticizer in excess of 2 percent, and therefore 5 weight percent will usually represent a preferred lower limit. Conversely, amounts of plasticizer in excess of about 15 weight percent will frequently produce little added benefit, and therefore that concentration represents a preferred upper limit in most instances. The amount utilized in any given case will, of course, depend upon a number of factors, including the composition of the polyamide film-forming resin and of the specific plasticizer employed, the actual processing temperatures involved, etc.

Insofar as specific plasticizers are concerned, the preferred agents fall within three main categories, namely the long chain fatty acid amides (i.e., those containing 16 to 18 carbon atoms in the chain), the aromatic sulfonamides, and the polyamides which exhibit a melting point temperature of less than about 400 degrees Fahrenheit. Within those categories, the most desirable plasticizers are lauramide, o,p-toluenesulfonamide, N-ethyl-o,p-toluenesulfonamide (the two sulfonamides of course being mixtures of the ortho and para isomers), and polyamides such as nylon 6,36, nylon 11 and nylon 12 having molecular weights of about 7,000 to 10,000. Other suitable specific products that can be used as the plasticizing agent include nylon 11 and 12 of about 25,000 molecular weight and melting at temperatures of about 370 degrees and 350 degrees Fahrenheit, respectively, 2,2,4-trimethyl-1,3-pentane-diol, cumylphenylbenzoate, and a product offered commercially by Paul and Stein Brothers of New York, N.Y. under the designation STYSOLAK AW, referred to as a polyethylene oxide. Based upon the foregoing, it is believed that other suitable plasticizing agents for use in the compositions of the present invention will occur to those skilled in the art. For example, it should be mentioned that the two aromatic sulfonamide compounds specified above are commercially available from the Monsanto Chemical Company under the designations SANTICIZER 9 and 8, respectively; other similar compounds sold under the same brand designation may also function desirably in the instant blends.

In producing the blends of the invention, it will generally be desirable to premix the plasticizer with the film-forming polyamide, so as to ensure that the plasticizer will be most effective in producing the desired result. This may best be done in a compounding extruder or the like, depending to some extent upon the physical state (i.e., whether it is a solid or a liquid) of the additive. It will generally be most advantageous to produce pellets of the plasticized polyamide, which can then be admixed with pellets of the EVOH copolymer, such as in a ribbon blender, prior to introduction into the extruder which is to be used for conversion to the film.

Such conversion may be effected in any suitable manner, such as by cast or blown film extrusion. As indicated previously, the compositions of the invention may also be coextruded by such techniques with resins of different composition for various purposes, such as to enhance certain properties or to provide properties that are not possessed by the blend film itself. For example, to provide a packaging material capable of heat sealing at relatively low temperatures, it may be desirable to provide a layer of an ionomer resin (i.e., DuPont SURLYN) on one side of the film. It might be emphasized at this point that, due to the presence of nylon in the blend, it may be possible to achieve adequate adhesion between the blend layer and the SURLYN layer without the utilization of any added adhesive; the same is not generally true of films made of EVOH copolymer, per se. Moreover, even in those instances in which an adhesive layer is utilized, still the blends of the invention offer considerable advantage, in that the level of adhesion is enhanced considerably.

As taught in U.S. Pat. Nos. 4,233,367, to Ticknor and Rein, 4,239,826, to Knott and Wang, and 4,254,169 to Schroeder (all of which are of common assignment herewith) a number of suitable extrudable adhesives are available on the market, typical of which are the products sold by Chemplex Company under the PLEXAR designation, and described in U.S. Pat. Nos. 4,087,587 and 4,087,588, and the resins sold by U.S. Industrial Chemicals Company, division of National Distillers and Chemical Corp. under the designations S-2037 and S-2038, which are described in U.S. Pat. No. 4,239,826. In all instances, it is believed that such adhesives may be categorized as either an anhydride modified polyolefin or a partially hydrolyzed ethylene vinyl acetate copolymer. Other suitable adhesives are available from Norchem Company under the designation No. 2910, and from DuPont as CXA 3101 (both being ethylene organic acid ester copolymer compositions).

As suggested above, the ratio of EVOH copolymer to polyamide film-forming resin in the blends will, of course, have a very significant effect upon the nature of the film produced. Thus, the higher the proportion of EVOH copolymer present in the composition, the greater will be its oxygen barrier capabilities. Tensile, tear and impact strength (as well as adhesive properties) will generally be increased in accordance with the amount of nylon present, and the cost of the blend will be reduced commensurately. From the standpoint of oxygen barrier properties, little improvement in the ability of nylon itself to serve that function is realized until the concentration of EVOH copolymer in the composition reaches about 20 percent; therefore, that represents a practical lower limit upon the amount of the copolymer to be included. On the other hand, the structural properties of ethylene vinyl alcohol resin are not substantially improved unless at least about 10 weight percent (based upon the total composition) of the film-forming nylon is blended therewith; hence, that will usually represent a practical lower limit upon the amount of nylon to be used. However, it should be appreciated that the incorporation of nylon in virtually any concentation may be of some benefit, if for no reason other than as a cost-saving measure.

A surprising aspect of the present invention resides in the fact that as much as 30 weight percent of the plasticized nylon may be included in the blend without reducing the oxygen barrier properties of the EVOH resin significantly, and this has generally been found to hold true regardless of the nature of the plasticizing agent utilized. More particularly, the unadulterated EVOH resins will normally transmit oxygen at a rate less than one cubic centimeter-mil, per square meter of surface area, during a period of 24 hours under conditions of zero relative humidity and 73 degrees Fahrenheit. The blends of the invention containing as much as 30 percent of film-forming polyamide are capable of oxygen barrier performance at rates not in excess of the same value. Perhaps it should be mentioned that oxygen transmission at the indicated rate is regarded to characterize an excellent oxygen barrier film, and generally the apparatus utilized for the determination (e.g., a MoCon oxygen analyzer) will not therefore be designed to measure lower values.

Exemplary of the efficacy of the present invention are the following specific Examples:

EXAMPLE ONE

Nylon 6, having a molecular weight of about 25,000 and a melting point temperature of about 430 degrees Fahrenheit, is compounded at about 430 degrees to 440 degrees Fahrenheit with either lauramide or nylon 12 (having a molecular weight of about 25,000, and a melting point temperature of about 347 degrees Fahrenheit) to produce preblends containing 95 percent by weight of the nylon 6, and 5 percent of the plasticizer. Pellets of the foregoing preblends and of EVOH copolymer (Kuraray EP-F) are then admixed in a ribbon blender, in proportions to provide 25:75; 50:50 and 25:75 blends of each of the two ingredients (i.e., the preblend and the EVOH). These are then converted into films by forcing them through an extruder having a one-inch screw and fitted with a die head having 14" wide die lips, and onto a chill roll, from which the films are recovered for testing; the films are of different thicknesses, varying from about 1 to 3 mils. Each film is tested for tensile strength and percent elongation (both Instron, at break—ASTM D-882), tear strength (constant radius—ASTM D-1922) total energy impact strength (dart—ASTM D-20.19.06) and for oxygen transmission (MoCon oxygen analyzer—24 hours at zero relative humidity and 73 degrees Fahrenheit); films of the nylon preblends and of the EVOH copolymer are subjected to the same tests, for comparison purposes.

As a result, it is found that in all instances the elongation and tear strength (in both the machine and also the cross machine directions) of the films produced from the blends of the invention are superior (and in some instances dramatically so) than those made from the straight EVOH copolymer. Similarly, the machine direction and cross machine direction tensile strengths of the blend films are better (and again, in some cases dramatically so) than the EVOH films, as are their impact strengths. However, it is to be noted that the film made from the 75:25 EVOH:nylon blend plasticized with nylon 12 evidences somewhat diminished tensile and impact strength values, from which it can be hypothesized that, although the polymeric plasticizers enable blending and processing with the EVOH copolymers (thereby offering economic benefits), they do not necessarily enhance structural properties.

Insofar as oxygen barrier performance is concerned, in all instances the blend films exhibit better properties than do the plasticized nylon films, per se, and the results appear to be independent of the particular plasticizer employed. Moreover, the decrease in oxygen transmission seems to be a non-linear function, in that the improvement in barrier capability occurs at a rate that is disproportionately greater than the increase in EVOH concentration would predict. Finally, at concentrations of 25 percent EVOH the oxygen barrier capability of the blend films is virtually indistinguishable from that of the unmodified EVOH films, evidencing a value of less than one cubic centimeter-mil per square meter, under the conditions previously set forth.

EXAMPLE TWO

Films are produced from blends having the same composition as those described in connection with Example One above, with the exception that different plasticizing agents are substituted for the lauramide or nylon 12 materials employed therein. Specifically, such blends are made using SANTICIZER 8 (N-ethyl-o,p-toluenesulfonamide), 2,2,4-trimethyl-1,3-pentanediol, nylon 11 (molecular weight 25,000), nylon 11 (molecular weight 7,000), nylon 6,36 (molecular weight 10,000), STYSOLAC AW, and cumylphenylbenzoate. In all instances, the films exhibit properties similar to those described above, performance being generally in decreasing order of benefit, as listed.

EXAMPLE THREE

Again, films are made as described in Example One, but utilizing in place of the EP-F copolymer the EVOH resins sold under the designations EP-E, GL-D, and GL-E (each of which is further identified hereinabove), and a 50:50 mixture of the GL-D and GL-E resins. In addition, lauramide is utilized at a concentration of 10 percent in all instances, and nylon 66 is substituted for the nylon 6 of the foregoing Example. Results comparable to those indicated therein are realized.

EXAMPLE FOUR

A preblend of nylon 6 containing 25 percent, based upon the weight thereof, of SANTICIZER 9 (o,p-toluenesulfonamide) is compounded and formed into pellets, which are mixed with pellets of EP-F resin to produce a 60:40 EVOH:nylon mixture. The mixture is heated to a temperature of about 430 degrees Fahrenheit, and the melt is forced through the combining head of an extruder, into which a quantity of fused PLEXAR 3 (ethylene vinyl acetate based adhesive) is also introduced for coextrusion with the blend onto a chill roll. The resultant composite film is recovered and tested for peel-strength, and it is found that the level of adhesion between the layers is approximately two foot pounds per inch of width of the strip utilized in the test. This can be contrasted with the results achieved wherein the same PLEXAR is coextruded under comparable conditions with the same, but nylon-free, EVOH copolymer, a peel strength of only about one foot pound per inch being exhibited by the resultant film.

Thus, it can be seen that the present invention provides a novel blend of a film-forming polyamide resin and an EVOH copolymer, which blend is processable at temperatures below those at which any substantial degradation of the EVOH copolymer will be encountered, to produce a film having a desirable balance of oxygen barrier and structural properties. The blend is well suited for coextrusion with a second resin, to produce a composite film in which adhesion between the layers is at a desirable level. The films can be produced with relative facility and good economy, and the invention also provides novel processes for producing such films, and novel films produced thereby.

Having thus described the invention, what is claimed is:

1. In a method for the production of a film having relatively high levels of strength and toughness and good oxygen barrier properties, the steps comprising:
   a. forming a blend of about 90 to 20 weight percent of a film-forming polyamide resin having a molecular weight of about 20,000 to 30,000 and a melting point temperature of about 415 degrees to 440 degrees Fahrenheit, conversely about 10 to 80 weight percent of an ethylene vinyl alcohol copolymer having a molecular weight of about 15,000 to 30,000 and a melting point temperature of about 325 degrees to 375 degrees Fahrenheit, and about 2 to 25 percent, based upon the weight of said polyamide resin, of a plasticizer therefor, said plasticizer being effective to lower the processing temperature of said polyamide resin to a value approximately that of said copolymer and below the temperature at which any sustantial amount of degradation would occur therein under appropriate conditions for extrusion;
   b. heating said blend to said processing temperature;
   c. forcing said blend through an extrusion die to produce a film of said blend; and
   d. cooling said film to obtain a product having such desirable levels of toughness and oxygen barrier capability.

2. The method of claim 1 wherein said processing temperature is in excess of about 400 degrees Fahrenheit.

3. The method of claim 2 wherein said processing temperature is about 430 degrees to 480 degrees Fahrenheit.

4. The method of claim 2 wherein said plasticizer is selected from the group consisting of fatty acid amides, aromatic sulfonamides and polyamides having a molecular weight of about 5,000 to 25,000 and a melting point temperature below about 400 degrees Fahrenheit.

5. The method of claim 4 wherein said plasticizer is selected from the class consisting of lauramide, o,p-toluenesulfonamide, N-ethyl-o,p-toluenesulfonamide and polyamides of 7,000 to 10,000 molecular weight.

6. The method of claim 1 including the additional step of compounding said film-forming polyamide resin and said plasticizer prior to said step of forming said blend.

7. The method of claim 1 including the additional step of introducing into said extruder a second resin having a composition different from that of said blend, said second resin being combined with said blend in said die to produce a laminar structure of plural layers, and said structure being extruded from said die as a multilayer film including one layer comprised of said blend and a second layer comprised of said resin.

8. The method of claim 7 wherein said resin is selected from the group consisting of ionomer resins, partially hydrolyzed ethylene vinyl acetate copolymer adhesive, anhydride modified polyolefin adhesives, and ethylene organic acid ester copolymer compositions.

9. The film produced in accordance with any one of claims 1, 3, 5 or 8.

* * * * *